United States Patent [19]
VanDenberg et al.

[11] Patent Number: 5,505,481
[45] Date of Patent: Apr. 9, 1996

[54] LIFT AXLE SUSPENSION SYSTEM

[75] Inventors: Ervin K. VanDenberg, Massillon; Lyle E. Turkson, Canton; Terry J. Weyer, Wadsworth, all of Ohio

[73] Assignee: Suspensions Incorporated, Canal Fulton, Ohio

[21] Appl. No.: 207,347

[22] Filed: Mar. 7, 1994

[51] Int. Cl.$^6$ .................................................. B60G 11/26
[52] U.S. Cl. ............................................. 280/704; 280/713
[58] Field of Search .................................. 280/704, 683, 280/684, 685, 661, 81.5, 81.6, 676, 682, 713

[56] References Cited

U.S. PATENT DOCUMENTS

| | | | |
|---|---|---|---|
| 3,612,572 | 10/1971 | Raidel | 280/124 |
| 4,000,913 | 1/1977 | Gibson | 280/704 |
| 4,261,597 | 4/1981 | Vandenberg | 280/688 |
| 4,300,787 | 11/1981 | Vandenberg | 280/704 |
| 4,573,704 | 3/1986 | Vandenberg et al. | 280/704 |
| 4,763,923 | 8/1988 | Raidel | 280/704 |
| 4,770,430 | 9/1988 | Lange | 280/81.5 |
| 4,773,670 | 9/1988 | Raidel, II | 280/688 |

OTHER PUBLICATIONS

Your Complete Suspension Company—Watson Suspension Systems—Sep. 1993—p. 5.
Don't Settle For Less—Spec. Watson!—Watson Suspension Systems—Jan. 1993–p. 93.
600 Series Suspension Parallelogram Pusher/Tag. Suspension Dynamics, Inc.—Eff. Date–Dec. 15, 1990.

*Primary Examiner*—Matthew C. Graham
*Attorney, Agent, or Firm*—Sand & Sebolt

[57] ABSTRACT

A lift axle suspension system to be mounted under a vehicle for selectively raising and lowering a tire-wheel assembly into and out of engagement with a road surface which includes a beam mounted to a hanger bracket via a pivot connector. The hanger bracket is rigidly attached to a vehicle frame rail. An air bellows is interposed vertically between one end of the beam and the hanger bracket for lowering the tire-wheel assembly into engagement with the road surface and providing the support therefor. Another air bellows extends horizontally from the hanger bracket, and is pivotally attached to the beam by a pivot plate at its other end. The pivot plate is pivotally mounted to the beam such that expansion of said other air bellows will cause the beam to rotate about the pivot connector raising the beam and attached axle to raise the tire-wheel assembly out of engagement with the road surface. The path of the horizontal air bellows is controlled by a control arm extending between the frame and pivot plate and controls the movement of the horizontal air bellows as it expands such that the ends of the bellows are substantially parallel when the bellows is in the fully compressed and fully expanded position, thus allowing the full available operating length of the lift air bellows to be utilized.

23 Claims, 6 Drawing Sheets

LIFT AXLE SUSPENSION SYSTEM

BACKGROUND OF THE INVENTION

1. Technical Field

The invention relates generally to axle suspensions for wheeled vehicles. More particularly, the invention relates to lift axle suspension systems. Specifically, the invention relates to lift axle suspension systems for selectively lowering and raising the wheels of a vehicle into and out of engagement with the road surface.

2. Background Information

With the advent following World war II of large load carrying capacity trucks and trailers in this country, came the need to provide add-on axles, for increasing the capacity of trucks over that of the chassis-cab design which was manufactured with a limited number of axles. While add-on axles effectively increased carrying capacity, it was soon realized that as the number of load bearing axles increased on a given vehicle, a number of difficulties arose. Specifically, tire scuffing, loss in fuel economy and the inability to safely corner, all were problems associated with add-on type axles. Mitigation of these problems was of primary concern to the industry, which concern resulted in the development of the lift axle suspension system. Such a suspension system could be selectively raised from the road surface or lowered into engagement with the road surface when needed, thereby mitigating the aforementioned problems.

Many types and varieties of lift axle suspensions have been designed and employed since their inception with varying degrees of success or failure. Among the most successful are those of the parallelogram air-powered lift type produced for example by Suspensions Inc., of Canal Fulton, Ohio, an example of which is sold as model number LP-K13.75- 12-002. Another type is the upwardly biased leaf spring produced by Turner Quick-Lift Corporation of Canton, Ohio, such as disclosed in U.S. Pat. No. 3,185,621. Both of these types of units have the advantage of being safe, durable, effective for their intended purpose, useful in both the pusher (forward of the drive axle), and tag (rearward of the drive axle) positions and on both truck chassis and trailers alike.

While these two types of lift axle suspensions have operated effectively and solved an important need in the art, each design presents a number of drawbacks. Specifically, in the parallelogram type air-lift suspension, the length of the overall unit prohibits its use where only short frame lengths are available to accommodate the suspension. While an upwardly biased leaf spring lift axle that is capable of fitting onto relatively short places has been developed, as disclosed in U.S. Pat. No. 3,904,220, it has not always achieved optimized lift height and spring life, and for certain purposes the overall length of the unit is too large.

Further, the parallelogram air-lift axle has presented a number of other drawbacks. These lift axle suspensions have not fully utilized the lift capacity of the air operated lift bellows, or air spring. The lift air spring in the prior suspensions generally fan open, such that one side of the spring remains relatively compressed while the opposing side is fully extended. When the lift air spring is fanned open in this manner, the spring's effective operating length is significantly less than the available operating length of the air spring.

In order to increase the overall effective operating length of the lift air spring, the rigid connection between the air spring plate and the beam, as embodied in model number MTL-50 sold by Turner Suspensions of Canton, Ohio, was changed to a pivoting connection which was offset from the centerline of the plate as included in Suspensions, Inc. model number LP-002. In this manner, the effective operating length of the air spring was increased. This offset pivot point made the expansion and contraction of the air spring less controllable, and therefore a large area below the lift spring was included in the suspension to assure that the spring would not be damaged during operation. This increased area under the lift spring significantly increases space requirements for the suspension system.

Another problem associated with previously existing lift axles is that they provide reduced lateral control for the associated axle and wheels and as such, tire scuffing is a consistent problem when the tires carried by the lift axle engage the road surface.

The parallelogram air-lift axle also includes an inherent interference between the torque rod and the suspension air bellows, such that as the air spring deflects during normal operation, the torque rod connection can contact the bellows and damage or destroy the air spring.

While some known lift suspensions are steerable in that the suspension includes caster bearings which allow the tire-wheel assembly to rotate relative to the axle in response to forces acting on the tire-wheel assembly, these systems only provide a limited angle through which the caster may rotate. The angle of steer is generally limited by the positioning and location of the hanger bracket.

Therefore, the need exists for a lift axle suspension system wherein the entire capacity of the lift air spring is utilized as the associated plates are substantially parallel when the air spring is in both the fully extended and fully compressed positions. Moreover, a need exists for such a lift axle suspension system where the expansion and compression of the lift air spring is controlled such that the spring's position during the bellow's expansion and contraction is controlled and predefined. Still further, the need exists for such a lift axle suspension system which will fit in a small space beneath a vehicle, is lightweight, and in which the suspension air spring does not interfere with the components of the suspension assembly.

SUMMARY OF THE INVENTION

Objectives of the invention include providing a lift axle suspension system in which the suspension system utilizes the full available operating capacity of the lift spring.

A further objective includes providing such a lift axle suspension system in which the plates attached to each end of the air spring are substantially parallel when the lift spring is in the fully expanded position and in the fully compressed position.

Another objective of the invention is to provide such a lift axle suspension system in which the position of the lift spring is controlled while the spring is expanded or inflated.

A still further objective is to provide such a lift axle suspension system in which the torque arm does not contact either air spring.

Yet another objective of the invention is to provide such a lift axle suspension system which is relatively light weight, and may be utilized in a relatively small space under the vehicle.

Another objective is to provide such a lift axle suspension system which provides lateral stability to the lift axle when the lift axle's tires are in engagement with the road surface.

Yet another objective is to provide such a lift axle suspension system which is steerable, and provides an increased angle of steer without interfering with other suspension components.

A still further objective of the invention is to provide such a lift axle suspension system which is of simple construction, which achieves the stated objectives in a simple, effective and inexpensive manner, and which solves problems and satisfies needs existing in the art.

These and other objectives and advantages of the invention are obtained by the improved lift axle suspension system for selectively raising and lowering a vehicle's tires into and out of engagement with a road surface, the general nature of which may be stated as including a beam having first and second ends; bracket means attached to the vehicle frame; first pivot means for pivotally attaching the beam to the bracket means intermediate said first and second ends of the beam; a first air bellows movable between expanded and collapsed positions and functionally positioned between the first end of the beam and the bracket means for pivotally moving the beam and axle in a first direction when in the expanded position for raising the tire-wheel assemblies out of engagement with the road surface, and permitting the axle and tire-wheel assemblies to move in a second direction when in the collapsed position, to lower the axle and tire-wheel assemblies into engagement with the road surface; said first air bellows having first and second ends with said first end being attached to the beam and the second end attached to the bracket means; a second air bellows functionally positioned between the vehicle frame and the second end of the beam for pivotally moving the beam and axle in a second direction for lowering the tire-wheel assembly into engagement with the road surface; and control means operatively connected between the bracket means and the first end of the first air bellows for maintaining the ends of said first air bellows generally parallel to each other when in the expanded and collapsed positions and for controlling movement of said first air bellows when moving toward the expanded position.

BRIEF DESCRIPTION OF THE DRAWINGS

A preferred embodiment of the invention, illustrative of the best mode in which the applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
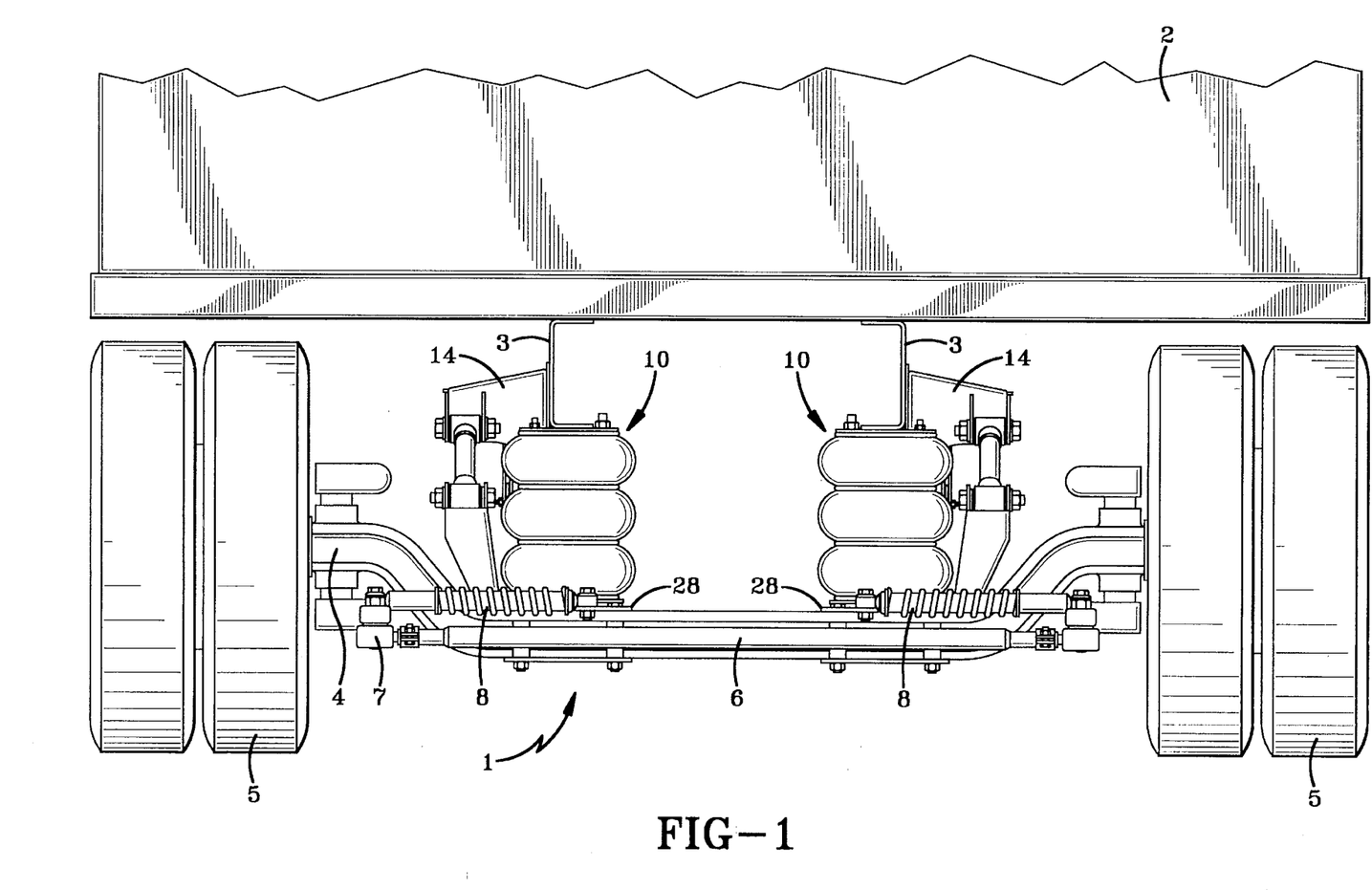
FIG. 1 is a rear elevational view of the axle lift suspension system of the present invention shown in combination with a trailer body, where said trailer body is shown broken away.

The improved lift axle suspension system of the invention is indicated generally at 1, and is shown installed on a vehicle 2 having a pair of frame rails 3 and an axle 4, the ends of which include casters 9 which support a pair of tire-wheel assemblies 5. Each caster 9 allows a respective tire-wheel assembly 5 to steer relative to axle 4 as vehicle 2 travels around a bend in a manner well known in the art. As shown in FIG. 1, suspension system 1 includes a pair of suspension assemblies indicated generally at 10, only one of which is shown in FIGS. 2–9, since the assemblies are similar to each other, one being a mirror image of the other, and joined by axle 4. A tie rod 6 is connected between a pair of stabilizer brackets 7, one of which is included in each assembly. Each assembly 10 also includes a steering dampener 8 as is known in the art for dampening lateral motion from the tire-wheel assemblies 5.

Figure 2:
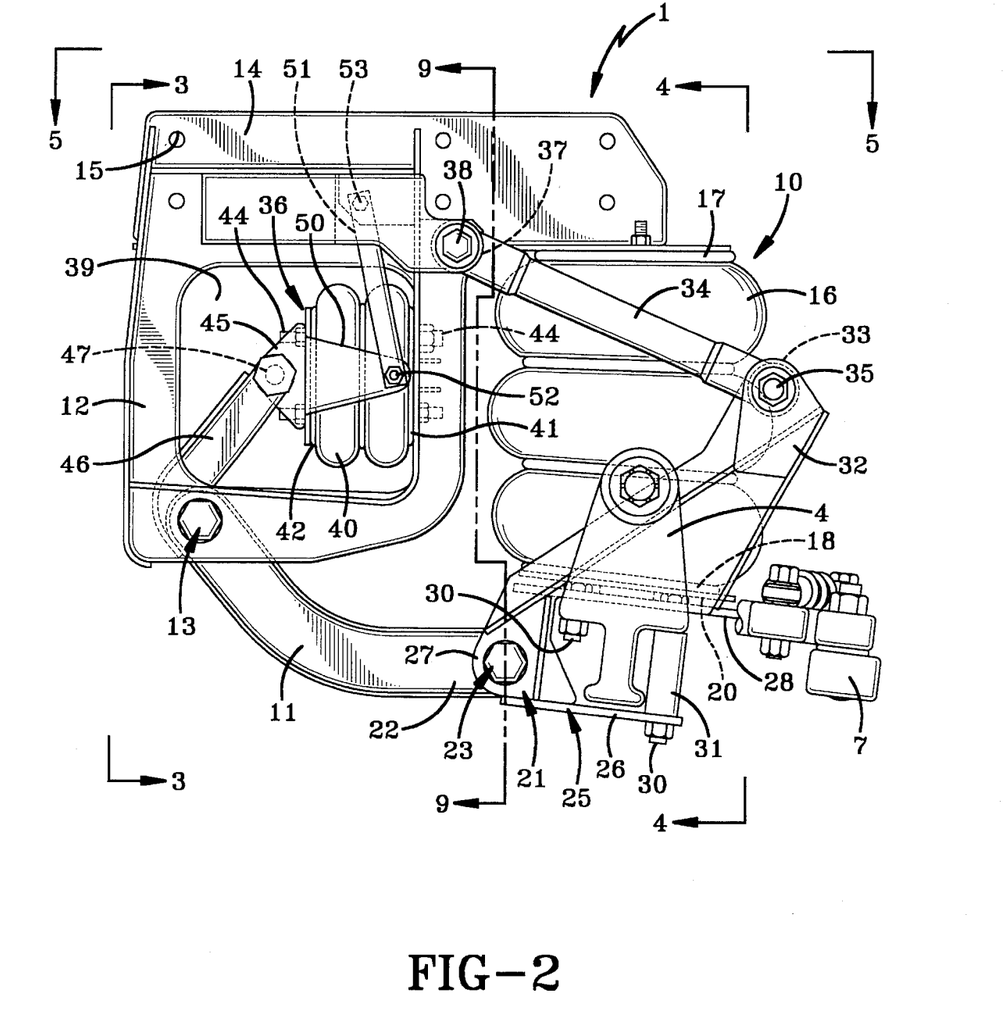
FIG. 2 is a side elevational view of the axle lift suspension system shown in FIG. 1 with portions broken away, and removed from the trailer.
Figure 3:
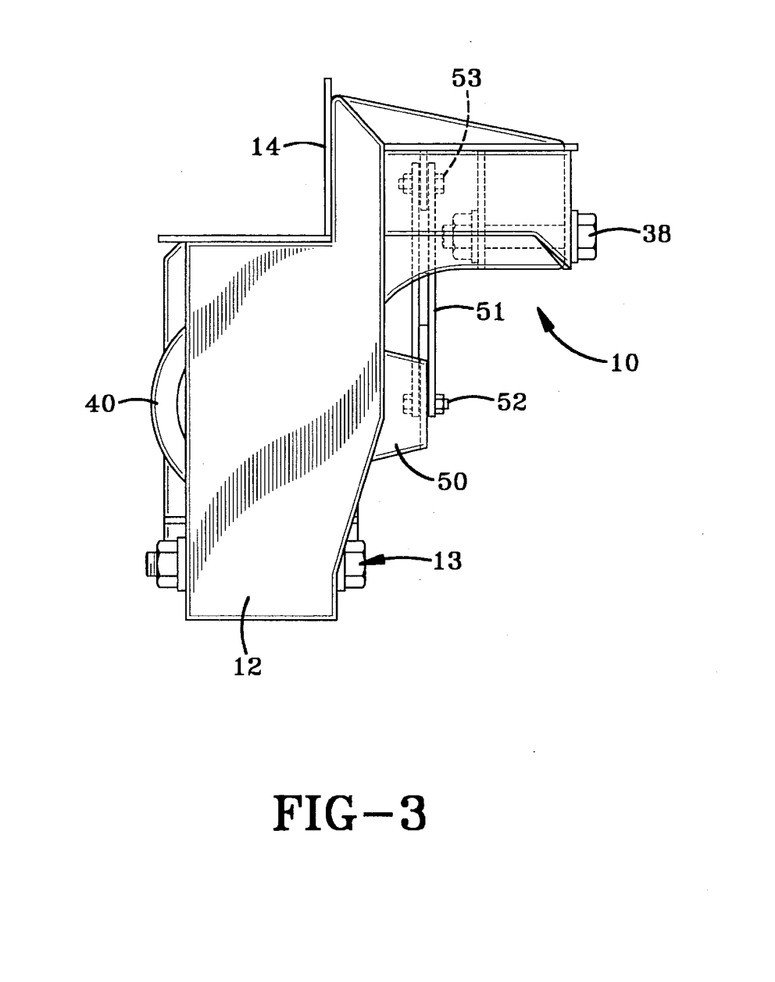
FIG. 3 is a front elevational view of one side of the lift axle suspension system taken substantially along line 3—3 of FIG. 2, with the axle assembly, suspension bellows and torque arm removed.
Figure 4:
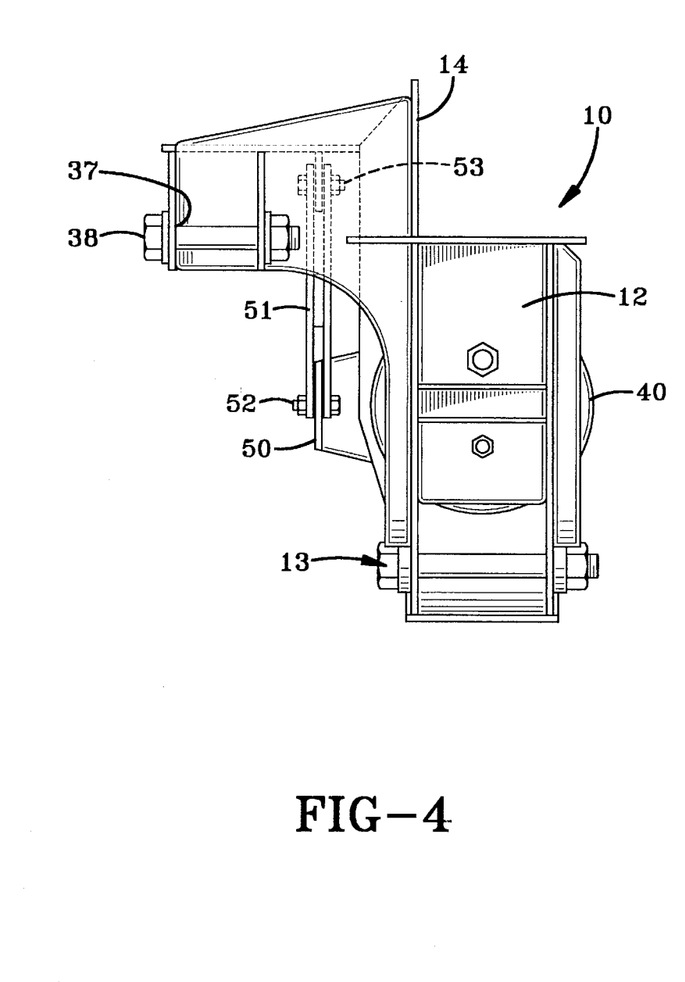
FIG. 4 is a rear elevational view of one side of the lift axle suspension system taken substantially along line 4—4 of FIG. 2, with the axle assembly, suspension bellows and torque arm removed.
Figure 5:
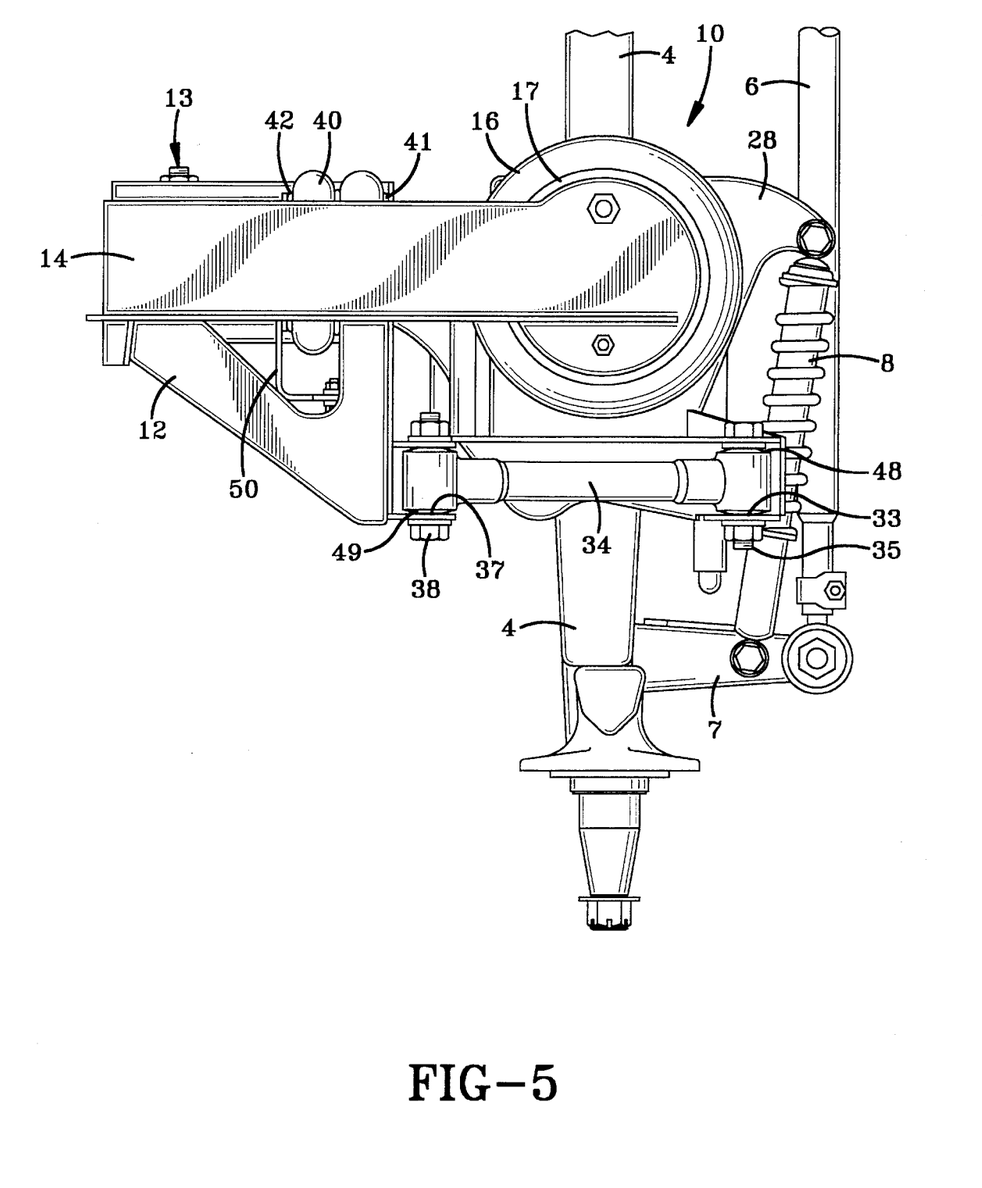
FIG. 5 is a fragmentary top plan view of the axle lift suspension system shown in FIG. 1, taken substantially along line 5—5 of FIG. 2.

Referring to FIG. 2, assembly 10 includes a curved rigid beam 11 connected at its forwardmost end to a generally rectangular hanger bracket 12 by a pivotal pin connection 13 and having a second free end 22. Hanger bracket 12 includes a triangular upper portion 12A with an edge 19 (FIG. 5). Hanger bracket 12 is welded to a mounting bracket 14 which is substantially L-shaped (FIG. 3) to accept a respective frame rail 3 on the inboard side thereof (FIG. 1). Mounting bracket 14 is mounted onto frame rail 3 via a plurality of bolts (not shown) passing through mounting holes 15. However, it should be understood that other mounting means such as welding may be used without departing from the spirit of the present invention.

An extensible and retractable air bellows or air spring 16 is located at free end 22 of beam 11 and is attached at its upper end 17 to mounting bracket 14 and at its lower end 18 to beam 11 via a plate pedestal 20. An axle connector assembly indicated generally at 21, is pivotally mounted on end 22 of beam 11 by a pivotal connection 23. In accordance with one of the main features of the invention, pivotal connection 23 (FIG. 9) includes a bolt and nut 29 and a flexible elastomeric bushing 24 having a length of between 9 and 12 inches. In the preferred embodiment, bushing 24 is approximately 10.5 inches long, the purpose for which will be described in detail hereinbelow.

Axle connector assembly 21 preferably includes a C-shaped axle plate indicated generally at 25, which is formed of a lower cover plate 26, a mounting flange 27, and a bellows seat 28. Bellows seat 28 and lower cover plate 26 are parallel and spaced apart, and are joined by mounting flange 27. The space between lower cover plate 26 and bellows seat 28 is such that axle 4 may fit therebetween. A plurality of bolts 30 pass through seat 28 to secure it to axle 4, and other bolts 30 pass through a number of spacer tubes 31 which properly position the axle within C-shaped axle plate 25. Axle connector assembly 21 also includes an extension arm 32 extending upwardly and to the rear of beam 11, the free end of which includes a mounting aperture 33.

A torque arm 34 is mounted at one end in aperture 33 of arm 32, and at the other end to triangular upper portion 12A of hanger bracket 12 through an aperture 37. In the preferred embodiment, both apertures 33 and 37 accept a complimentarily shaped bushing 48 and 49 respectively (FIG. 5) which accept respective mounting pins 35 and 38. It is noted that extension arm 32 extends rearwardly past air bellows 16 such that mounting pin 35 is positioned behind bellows 16. In this manner, as bellows 16 flexes during operation, pin 35 will not interfere with bellows 16. Moreover, when bellows 16 is in the partially compressed position shown in FIG. 7 and the fully compressed position shown in FIG. 8, pin 35 will be moved further behind bellows 16 thereby assuring that pin 35 does not contact and damage bellows 16.

In accordance with one of the features of the invention, edge 19 of triangular upper portion 12A extends between aperture 37 and mounting bracket 14.

In accordance with the invention, a lift assembly 36 is located on the inboard side of hanger bracket 12 (FIG. 2). Lift assembly 36 includes an expandable air bellows 40 extending horizontally between a rigid plate 41 and a movable plate 42. Rigid plate 41 is connected to an inside wall of hanger bracket 12. Moreover, rigid plate 41 and movable plate 42 are each mounted to air bellows 40 via bolts 44. Movable plate 42 includes a triangularly shaped flange 45 which is pivotally attached to a beam extension 46 via pin connector 47 such that beam extension 46 rotates with respect to flange 45. The other end of beam extension 46 is welded to beam 11 adjacent pivotal connector 13 such that movement of beam 11 will effectuate movement of extension 46. It should be apparent to one of ordinary skill in the art that while extension 46 and beam 11 are welded in the preferred embodiment, any rigid connection therebetween would operate equally well without departing from the spirit of the present invention.

Figure 6:
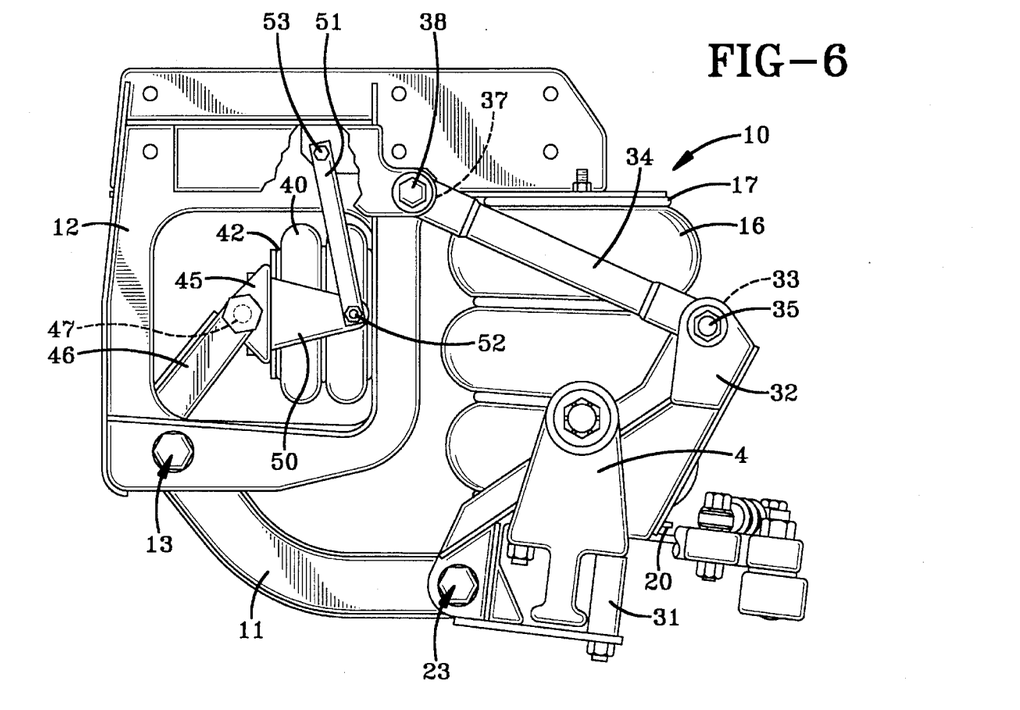
FIG. 6 is a side elevational view of the lift axle suspension system as shown in FIG. 2, with a portion cutaway, and with the axle shown in the fully lowered position.
Figure 8:
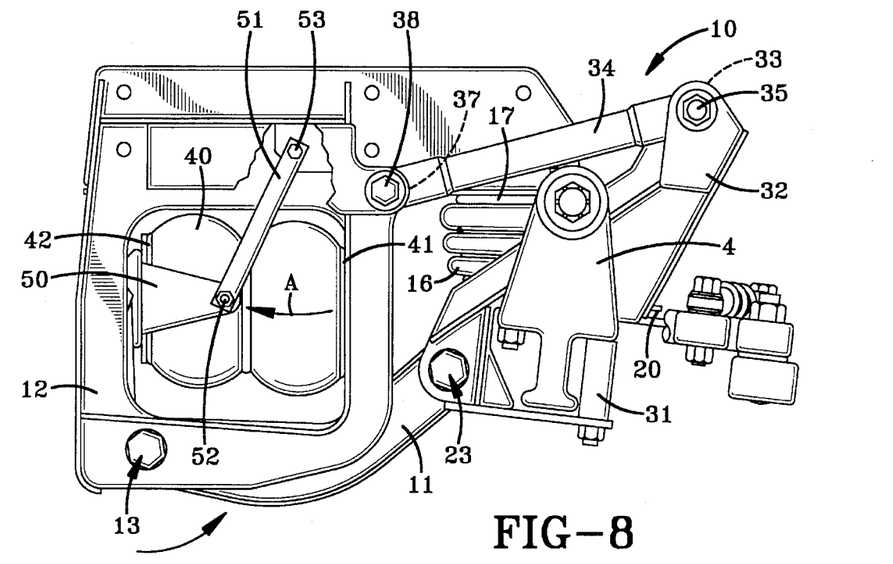
FIG. 8 is a side elevational view as shown in FIGS. 6 and 7, with the axle in the fully raised position.
Figure 9:
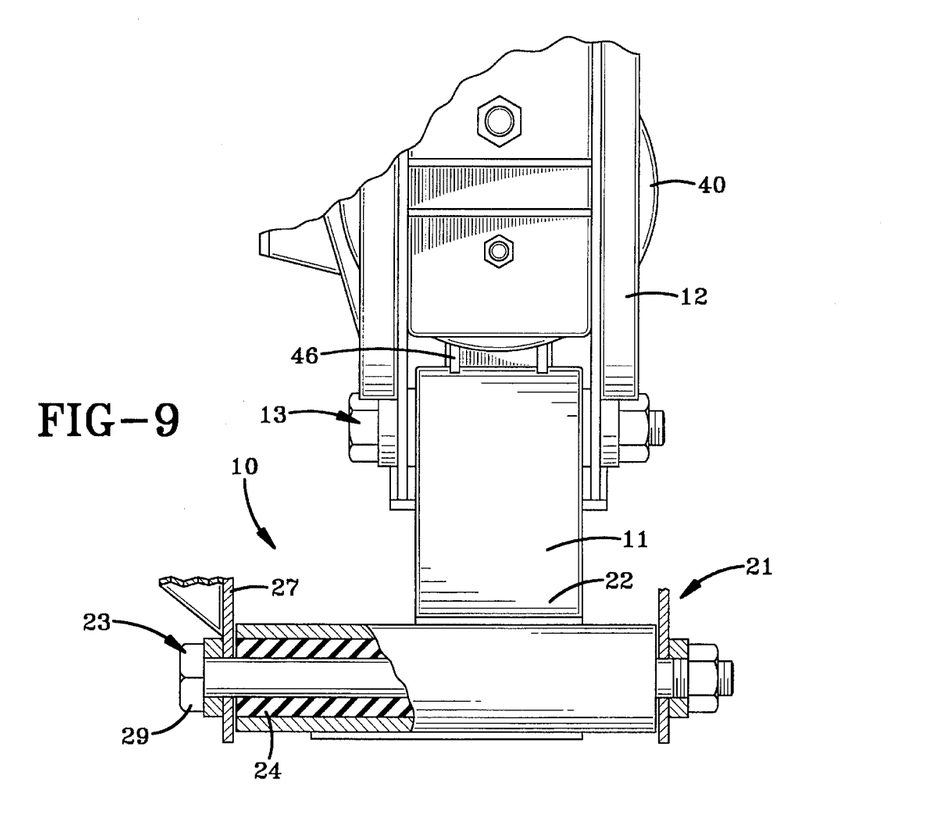
FIG. 9 is a fragmentary view taken along line 9—9 in FIG. 2 with portions broken away and in section.

In further accordance with the invention, a triangularly shaped control flange 50 extends rearwardly of movable plate 42 and to the side of air bellows 40, the free end of which is pivotally connected to a control arm 51 by a pivot 52. A second end of control arm 51 is attached to hanger bracket 12 by a pivot 53. Control arm 51 is of a length sufficient to assure that when air bellows 40 is in the compressed position as shown in FIGS. 2 and 6, rigid plate 41 and movable plate 42 are substantially parallel. Similarly, the length of extension 46 is related to the length of control arm 51 such that when air bellows 40 is fully expanded as shown in FIG. 8, rigid plate 41 and movable plate 42 are substantially parallel for purposes which will be described below. Hanger bracket 12 includes a central opening 39 through which lift assembly 36 extends to provide sufficient clearance for air bellows 40.

In the preferred embodiment, pivotal pin connection 13 and mounting pins 35 and 38 are mounted within relatively flexible elastomeric bushings such that movement between the respective moving parts occurs from flexing within the bushing. This is also true of pivotal connection 23 as discussed above. However, connection 23 also operates to reduce lateral movement of axle 4 with respect to suspension system 1 when tire-wheel assemblies 5 are in contact with the road surface. In essence, the width of bushing 24 (FIG. 9) prevents conical loading of pivotal connection 23. Conversely, pivots 52 and 53, as well as pin connector 47 do not include a flexible bushing, but rather simply allow rotational movement of the respective members with relation to each other.

Regarding the operation of lift axle suspension system 1, conventional air valve and actuating means located in the cab of the vehicle (not shown) are provided to manipulate the flow of pressurized air into or out of either air bellows 16 and 40. For example, prior to the time that the vehicle (e.g. heavy dump truck or trailer) is loaded such that one does not desire to have tire-wheel assembly 5 in tire scuffing road engagement, the unit would be in its lifted position as illustrated in FIG. 8. In this position, vertical air bellows 16 are exhausted of air, while horizontal air bellows 40 are in their expanded position, thereby raising plate pedestals 20 from their lowered position of FIG. 6 to the maximum height possible as shown in FIG. 8. This in turn raises axle 4, and tire-wheel assemblies 5 to the maximum height off of the road surface. Upon reaching the maximum height when in the raised position, pivot plates 42 may contact hanger brackets 12 to limit the further expansion of bellows 16, or alternately, air bellows 16 may include a conventional internal bumper which acts as a stop to the lifting action. In this manner, the counterforces between plates 42 of bellows 40 and brackets 12, or alternatively the bumpers inside of bellows 16, serve to firmly hold axle 4 in its lifted, riding position.

Suspension system 1 is also simply and conveniently lowered by manipulating the valves in the vehicle cab to exhaust air from bellows 40, and pump air into bellows 16 thereby allowing the weight of the axle and tire-wheel assemblies 5 to act against the bellows 40 until tire-wheel assemblies 5 engage the road surface. After assemblies 5 engage the road surface, air is continued to be pumped into bellows 16 to firm the suspension as shown in FIG. 6 and provide the support for tire-wheel assemblies 5. When the suspension is in the position shown in FIG. 6, bellows 16 also act as an air ride suspension between frame rails 3 (FIG. 1) and the road surface.

When suspension system 1 is positioned as shown in FIG. 6, rigid plates 41 are parallel to movable plates 42, and lift air bellows 40 are in the substantially deflated or collapsed position. Air bellows 16 thus operates as a normal air suspension and the entire system operates as a shock absorber thereby eliminating the need for a separate device to act in this regard.

Figure 7:
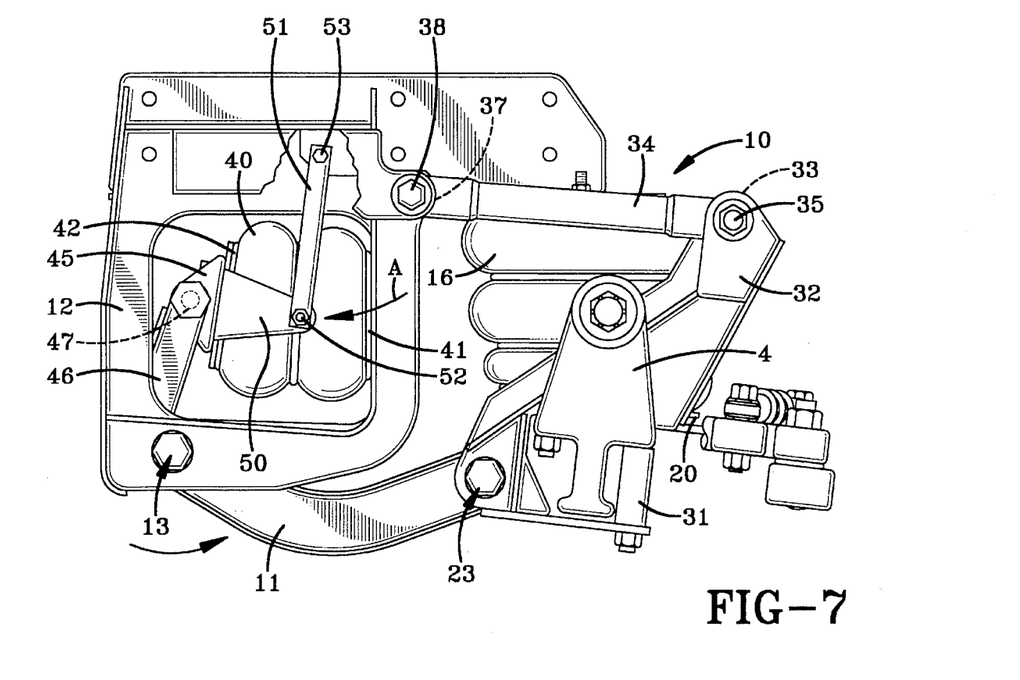
FIG. 7 is a side elevational view as shown in FIG. 6, with the axle in an intermediate position.

If the operator wishes to raise axle 4 out of engagement with the road surface; if for example, the truck has been emptied, and there is no longer a need for axle 4 to support a portion of the load, the valve within the cab will be manipulated such that air is pumped into bellows 40, and withdrawn from bellows 16. In this manner, the expansion of bellows 40 will move movable plates 42 forwardly causing beam extensions 46 to rotate about pivot connectors 47. Inasmuch as beam extensions 46 and beams 11 are rigidly attached, the movement of extensions 46 will cause beams 11 to rotate about pivotal connectors 13 thereby raising plate pedestals 20 and consequently axle 4, as shown in FIGS. 6–8. The movement of plate pedestals 20 will cause axle plates 25 to rotate at pivotal connectors 23, and will also force torque arms 34 to rotate at their ends in the bushings within mounting apertures 33 and 37.

In accordance with the invention, as suspension system 1 moves through the above described path of travel from the lowered position of FIG. 6 to the raised position of FIG. 8, control arm 51 will rotate at pivots 52 and 53. Control arm 51 thus prevents air bellows 40 from expanding in an uncontrolled manner as in the prior art, by providing a counter clockwise moment about pin connector 47 in opposition to the moment urging movable plate 42 to rotate clockwise. Specifically, control arm 51 will assure that the lower side of bellows 40 expands first, but along a path related to the arc traveled by the lower end of control arm 51, which arc is signified in FIG. 7 by arrow A.

The relative lengths of control arm 51 and beam extension 46 assures that the initial expansion of bellows 16 will not cause the bellows to interfere with the remaining structure of either vehicle 2 or suspension system 1, thereby significantly reducing the space required by previous systems where the bellows expansion was less controlled.

As pressurized air continues to be pumped into bellows 40 and removed from bellows 16, suspension system 1 will assume the position as shown in FIG. 8, where bellows 16 is fully compressed, and bellows 40 is fully expanded or inflated. When so configured, rigid plate 41 and movable plate 42 are substantially parallel. Specifically, the pivotal connection between control arm 51 and control flange 50 assures that when the expanded position is reached by the movable plate as shown in FIG. 8, it will be parallel to rigid plate 41. As shown in FIGS. 6 and 8, by assuring that rigid plate 41 and movable plate 42 are substantially parallel when lift air bellows 40 is in the fully compressed and the fully expanded position, the full available operating length of lift air bellows 40 is utilized. Furthermore, as shown in FIG. 7, the expansion of bellows 40 is controlled by the interaction of control flange 50 and control arm 51 as the bellows move towards the expanded condition.

Regarding the operation of casters 9, as vehicle 2 travels around the corner, forces acting on tire-wheel assemblies 5 cause caster 9 to rotate relative to axle 4 providing a self-steering axle. As casters 9 rotate, the tire-wheel assemblies 5 will move closer to edge 19 of triangular upper portion 12A of hanger bracket 12. The radial distance traveled by the leading edge of the tire-wheel assemblies 5 is the steering angle permitted by the suspension. The steering angle of lift axle suspension system 1 is increased in part because of the angled orientation of edge 19, and also because mounting pins 38 extending through aperture 37 is supported from triangular upper portion 12A rather than hanger bracket 12. By raising the location of mounting pins 38, triangular upper portion 12A is positioned closer to axle 4 further increasing the steerable angle of suspension 1.

Lift axle suspension system 1 of the present invention thus uses the full available operating length of air bellows 40 while simultaneously controlling the position of bellows 40 as it expands to lift axle 4 out of engagement with the road. Further, by controlling the movement of air bellows 40, less room is required for it to expand thereby significantly reducing the overall length and weight of suspension system 1.

The lift axle suspension system is thus lightweight, and smaller than existing lift axle systems. Moreover, the interaction between control flange 50 and control arm 51 assures that horizontal air bellows 40 is controlled while it expands from the fully compressed position, to the fully expanded position. The invention also provides that the full available lift capacity of air bellows 40 is utilized as rigid plate 41 and movable plate 42 are parallel when air bellows 40 is in the fully compressed, and fully expanded position. Plates 41 and 42 remain parallel via the operative interaction between control flange 50 connected to movable plate 42, and control arm 51.

Accordingly, the improved lift axle suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lift axle suspension system is constructed and used, the characteristics of the construction, and the advantageous, new and useful results obtained; the new and useful structures, devices, elements, arrangements, parts and combinations, are set forth in the appended claims.

We claim:

1. A lift axle suspension system for selectively raising and lowering an axle and a pair of tire-wheel assemblies of a vehicle into and out of engagement with a road surface for use with vehicles of the type having a longitudinally extending frame member on either side of the vehicle, said system comprising with respect to each frame member:

a beam having first and second ends;

bracket means attached to the vehicle frame;

first pivot means for pivotally attaching the beam to the bracket means intermediate said first and second ends of the beam;

a first air bellows movable between expanded and collapsed positions and functionally positioned between the first end of the beam and the bracket means for pivotally moving the beam and axle in a first direction when in the expanded position for raising the tire-wheel assemblies out of engagement with the road surface, and permitting the axle and tire-wheel assemblies to move in a second direction when in the collapsed position, to lower the axle and tire-wheel assemblies into engagement with the road surface; said first air bellows having first and second ends with said first end being attached to the beam and the second end attached to the bracket means;

a second air bellows functionally positioned between the vehicle frame and the second end of the beam for pivotally moving the beam and axle in a second direction for lowering the tire-wheel assembly into engagement with the road surface; and control means operatively connected between the bracket means and the first end of the first air bellows for maintaining the ends of said first air bellows generally parallel to each other when in the expanded and collapsed positions and for controlling movement of said first air bellows when moving toward the expanded position by controlling the movement of the first end of the first air bellows.

2. The lift axle suspension system defined in claim 1 further comprising attachment means for attaching the axle to the second end of the beam.

3. The lift axle suspension system defined in claim 2 in which the attachment means includes an axle bracket, and an elongated bushing connecting said axle bracket to said beam, whereby said bushing reduces lateral movement of said axle with respect to said beam.

4. The lift axle suspension system defined in claim 3 in which said elongated bushing has a length in the range of from 9 to 12 inches.

5. A lift axle suspension system as defined in claim 1 wherein the axle is operatively mounted adjacent the second end of said beam for movement with said second end.

6. A lift axle suspension system for selectively raising and lowering an axle and a pair of tire-wheel assemblies of a vehicle into and out of engagement with a road surface for use with vehicles of the type having a longitudinally extending frame member on either side of the vehicle, said system comprising with respect to each frame member:

a beam having first and second ends;

bracket means attached to the vehicle frame;

first pivot means for pivotally attaching the beam to the bracket means intermediate said first and second ends of the beam;

a first air bellows movable between expanded and collapsed positions and functionally positioned between the first end of the beam and the bracket means for pivotally moving the beam and axle in a first direction when in the expanded position for raising the tire-wheel assemblies out of engagement with the road surface, and permitting the axle and tire-wheel assemblies to move in a second direction when in the collapsed position, to lower the axle and tire-wheel assemblies into engagement with the road surface; said first air bellows having first and second ends with said first end being attached to the beam and the second end attached to the bracket means;

a second air bellows functionally positioned between the vehicle frame and the second end of the beam for pivotally moving the beam and axle in a second direction for lowering the tire-wheel assembly into engagement with the road surface; and control means including a control plate attached to the first end of the first air bellows and extending along said air bellows towards the second end of said bellows, and a control arm extending between and movably connected to a free end of the control plate and to the bracket means, operatively connected between the bracket means and the first end of the first air bellows for maintaining the ends of said first air bellows generally parallel to each other when in the expanded and collapsed positions and for controlling movement of said first air bellows when moving toward the expanded position.

7. The lift axle suspension system defined in claim 6 in which the first end of the beam is pivotally mounted on the control bracket.

8. The lift axle suspension system defined in claim 6 in which the bracket means is a rigid bracket formed with a central opening; and in which the control plate extends through said bracket opening and along the first air bellows generally parallel to a longitudinal axis thereof.

9. The lift axle suspension system defined in claim 7 in which the bracket is generally rectangular having a pair of spaced parallel frame members extending downwardly from the frame; and in which the second end of the first air bellows is securely attached to one of said frame members.

10. The lift axle suspension system defined in claim 6 in which the free end of the control plate is located adjacent the second end of the first air bellows when said bellows is in the collapsed position.

11. The lift axle suspension system defined in claim 6 in which the free end of the control plate is located generally adjacent the midpoint of the first air bellows when said first bellows is in the expanded condition.

12. A lift axle suspension system for selectively raising and lowering an axle and a pair of tire-wheel assemblies of a vehicle into and out of engagement with a road surface for use with vehicles of the type having a longitudinally extending frame member on either side of the vehicle, said system comprising with respect to each frame member:

a substantially rigid beam having a first end and a second end;

bracket means for attaching the beam to a respective longitudinally extending frame member of the vehicle;

first pivot means for pivotally attaching the beam to the bracket means;

a support element substantially positioned between said beam and the frame member at a spaced distance from said bracket means adapted for supporting the vehicle when the tire-wheel assemblies engages the road surface;

lift means having a first and a second end for raising the axle and tire-wheel assemblies out of engagement with the road surface, with said first end being attached to the beam and the second end attached to the bracket means; and control means operatively connected between the bracket means and the lift means for maintaining the ends of said lift means generally parallel to each other when the tire-wheel assembly is in a raised position and in the lowered position and for controlling movement of the lift means when the tire-wheel assembly is moving toward the raised position by controlling the movement of the first end of the first air bellows.

13. The lift axle suspension system defined in claim 12 in which the lift means includes a first air bellows movable between an expanded position and a collapsed position and functionally positioned between the first end of the beam and bracket means for pivotally moving the beam and axle in a first direction when in the expanded position for raising the tire-wheel assemblies out of engagement with the road surface, and permitting the axle and tire-wheel assemblies to move in a second direction when in the collapsed position, to lower the axle and tire-wheel assemblies into engagement with the road surface.

14. A lift axle suspension system for selectively raising and lowering an axle and a pair of tire-wheel assemblies of a vehicle into and out of engagement with a road surface for use with vehicles of the type having a longitudinally extending frame member on either side of the vehicle, said system comprising with respect to each frame member:

a beam having first and second ends;

bracket means attached to the vehicle frame;

first pivot means for pivotally attaching the beam to the bracket means intermediate said first and second ends of the beam;

a first air bellows movable between expanded and collapsed positions and functionally positioned between the first end of the beam and the bracket means for pivotally moving the beam and axle in a first direction when in the expanded position for raising the tire-wheel assemblies out of engagement with the road surface, and permitting the axle and tire-wheel assemblies to move in a second direction when in the collapsed position, to lower the axle and tire-wheel assemblies into engagement with the road surface; said first air bellows having first and second ends with said first end being attached to the beam and the second end attached to the bracket means;

a second air bellows functionally positioned between the vehicle frame and the second end of the beam for pivotally moving the beam and axle in a second direction for lowering the tire-wheel assembly into engagement with the road surface and which extends generally vertically between the frame and second end of the beam;

a beam extension rigidly mounted at the second end of the beam and extending upwardly and outwardly from said second end; and control means operatively connected between the bracket means and the first end of the first air bellows for maintaining the ends of said first air bellows generally parallel to each other when in the expanded and collapsed positions and for controlling movement of said first air bellows when moving toward the expanded position.

15. The lift axle suspension system defined in claim 14 in which a torque arm has one end pivotally attached to a free end of the beam extension and a second end pivotally connected to the bracket means and extends past the second air bellows.

16. The lift axle suspension system defined in claim 15 in which the free end of the beam extension and pivotal attachment to the torque arm is spaced outboard from said second air bellows and out of contact therewith.

17. The lift axle suspension system defined in claim 15 in which the bracket means includes an upper portion; and in which the torque rod is pivotally connected to said upper portion.

18. The lift axle suspension system defined in claim 17 in which the upper portion includes an edge extending angularly away from the torque rod and inwardly toward the bracket means.

19. The lift axle suspension system defined in claim 18 in which the axle includes caster bearings for self-steerably supporting the tire-wheel assemblies, and in which one tire-wheel assembly is positioned adjacent the edge of the upper portion when the caster bearings are rotated relative to the axle.

20. The lift axle suspension system defined in claim 19 in which the upper portion is triangularly shaped.

21. A lift axle suspension system for selectively raising and lowering an axle and a pair of tire-wheel assemblies of a vehicle into and out of engagement with a road surface for use with vehicles of the type having a longitudinally extending frame member on either side of the vehicle, said system comprising with respect to each frame member:

a substantially rigid beam having a first end and a second end;

bracket means for attaching the beam to a respective longitudinally extending frame member of the vehicle;

first pivot means for pivotally attaching the beam to the bracket means;

a support element substantially positioned between said beam and the frame member at a spaced distance from said bracket means adapted for supporting the vehicle when the tire-wheel assemblies engages the road surface;

lift means having a first and a second end for raising the axle and tire-wheel assemblies out of engagement with the road surface, with said first end being attached to the beam and the second end attached to the bracket means; and control means including a control plate attached to the first end of the lift means and extending along said lift means toward the second end of said lift means, and a control arm extending between and movably connected to a free end of the control plate and to the bracket means operatively connected between the bracket means and the lift means for maintaining the ends of said lift means generally parallel to each other when the tire-wheel assembly is in a raised position and in the lowered position and for controlling movement of the lift means when the tire-wheel assembly is moving toward the raised position.

22. The lift axle suspension system defined in claim 21 in which the support element is a second air bellows.

23. The lift axle suspension system defined in claim 21 in which the free end of the control plate is located adjacent the second end of the first air bellows when said bellows is in the collapsed position.

* * * * *